UNITED STATES PATENT OFFICE.

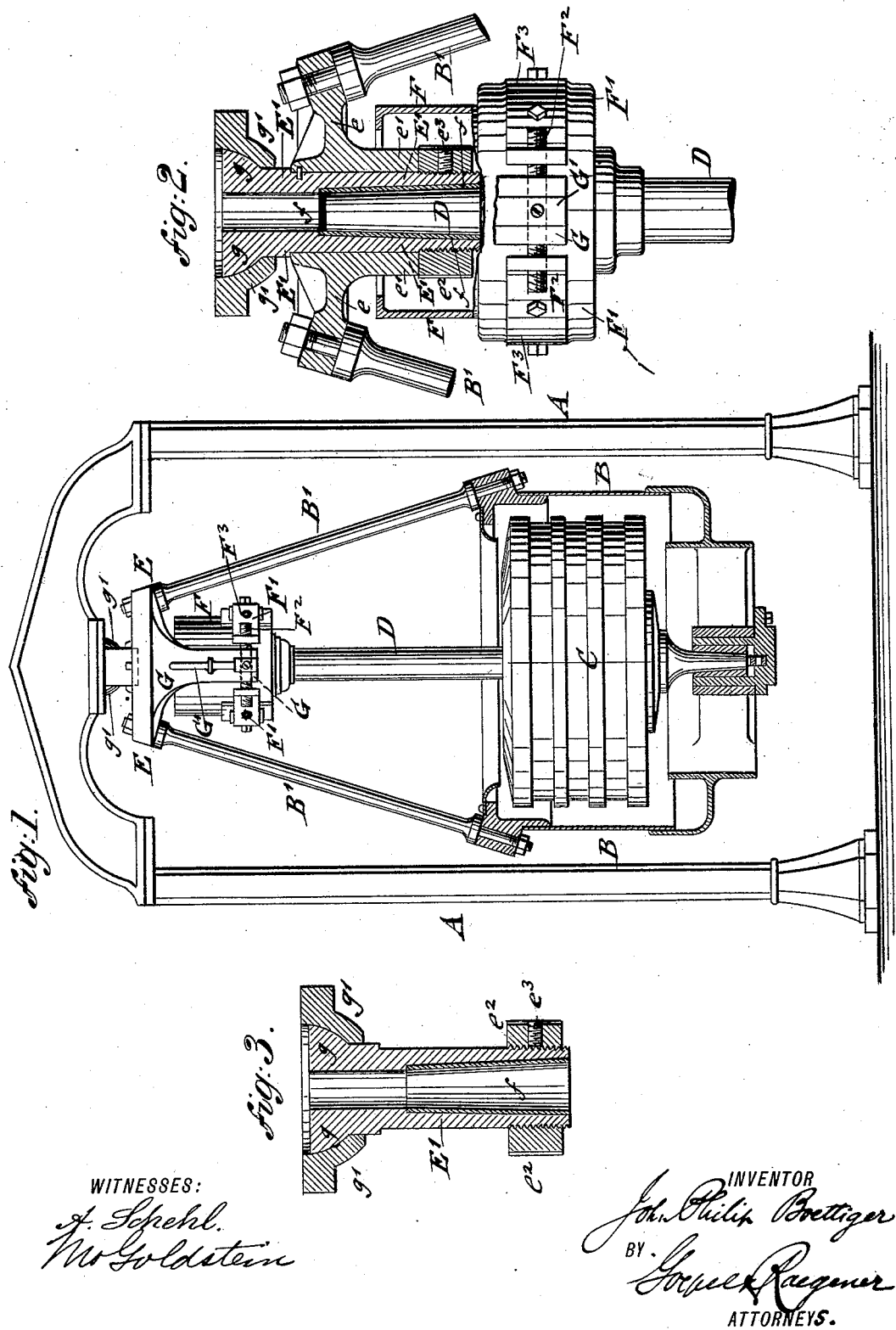

JOHN PHILIP BOETTIGER, OF COLD SPRINGS, NEW YORK.

CENTRIFUGAL MACHINE.

SPECIFICATION forming part of Letters Patent No. 408,822, dated August 13, 1889.

Application filed August 1, 1888. Serial No. 281,633. (No model.)

*To all whom it may concern:*

Be it known that I, JOHN PHILIP BOETTIGER, of Cold Springs, in the county of Putnam and State of New York, have invented certain new and useful Improvements in Centrifugal Machines, of which the following is a specification.

This invention relates to the mechanism for suspending the basket of a centrifugal machine.

The objects of the invention are to provide a mechanism of this character which will afford a steady support for the basket and in which parts may be readily duplicated in case of breakage.

In the accompanying drawings, Figure 1 represents a side elevation of a centrifugal machine with my improved suspension-head. Fig. 2 is a vertical central section through the suspension-head, drawn on a larger scale; and Fig. 3 is a detail vertical central section of the suspension-sleeve of the head with its ball-bearing and collar.

Similar letters of reference indicate corresponding parts.

Referring to the drawings, A represents the supporting-frame of my improved centrifugal machine. B is the casing, C the basket, and D the spindle, of the same. The casing B is rigidly suspended by inclined suspension-rods B' from a suspension-head E of the supporting-frame A, the rods being attached to eyes of the disk-shaped web $e$ of the suspension-head E, as shown clearly in Figs. 1 and 2. The web $e$ is made integral with a hub $e'$, that is keyed to a suspension-sleeve E' by means of a check-nut $e^2$, that is screwed on to the threaded lower end of the sleeve E' and secured thereto by a clamping-screw $e^3$. The hub $e'$ of the suspension-head E is provided with an interior bushing or lining for the spindle D. The suspension-sleeve E' has an enlarged ball-shaped head $g$, which is made integral with the sleeve and which is supported in a corresponding socket $g'$ at the top of the supporting-frame A. The upper end of the spindle D is guided in the bushing or lining $f$ of the suspension-sleeve, said bushing being made of anti-friction metal, so as to reduce the friction of the spindle as much as possible. The lower end of the spindle is supported in a step-bearing of any approved construction, the bushing or lining of which is also made of anti-friction metal and properly adjusted for the spindle. The suspension-head supports the casing and spindle of the centrifugal machine and centers itself accurately into line with the axis of the machine by gravity and the ball-and-socket suspension device, the rigid connection between the head and casing serving to keep the upper and lower bearings of the spindle in accurate alignment.

To the spindle is keyed a driving-pulley F, which is extended downward so as to form a brake-cylinder F' for the brake-band $F^3$, which may be made of any approved construction, and which is operated by a lever G, that is keyed to a right and left hand screw-bolt $F^2$, which bolt engages the lugs at the ends of the brake-band $F^3$. The lever G is pivoted to bearings at the lower end of a bracket-arm or hanger G' of the suspension-head, as shown in Fig. 1.

Having thus described my invention, I claim as new and desire to secure by Letters Patent—

The combination of a supporting-ball socket, a suspension-sleeve provided at its upper end with a ball engaging said socket, with an interior bearing for the spindle, and with an exterior screw-thread at its lower end, a suspension-head provided with a tubular hub fitting over said sleeve and keyed thereto, a nut engaging the screw-threads of said sleeve and holding said head on the sleeve, a casing provided with a step-bearing, suspension-rods connected at their upper ends to said head and at their lower ends to said casing, a spindle turning at its lower end in said step-bearing and at its upper end in the bearing of said sleeve, and a basket on said spindle within said casing.

In testimony that I claim the foregoing as my invention I have signed my name in presence of two subscribing witnesses.

J. PHILIP BOETTIGER.

Witnesses:
PAUL GOEPEL,
MARTIN PETRY.